(12) United States Patent
Tuomikoski

(10) Patent No.: US 11,090,582 B2
(45) Date of Patent: Aug. 17, 2021

(54) METHOD AND APPARATUS FOR REMOVAL OF SURFACE SCUM

(71) Applicant: FINNCHAIN OY, Rauma (FI)

(72) Inventor: Pekka Tuomikoski, Rauma (FI)

(73) Assignee: FINNCHAIN OY, Rauma (FI)

( * ) Notice: Subject to any disclaimer, the term of this patent is extended or adjusted under 35 U.S.C. 154(b) by 0 days.

(21) Appl. No.: 16/611,670

(22) PCT Filed: Apr. 19, 2018

(86) PCT No.: PCT/FI2018/050276
§ 371 (c)(1),
(2) Date: Nov. 7, 2019

(87) PCT Pub. No.: WO2018/206840
PCT Pub. Date: Nov. 15, 2018

(65) Prior Publication Data
US 2020/0164287 A1 May 28, 2020

(30) Foreign Application Priority Data
May 8, 2017 (FI) ..................................... 20175403

(51) Int. Cl.
*B01D 21/24* (2006.01)
*B01D 21/00* (2006.01)
(Continued)

(52) U.S. Cl.
CPC ..... *B01D 21/0012* (2013.01); *B01D 21/2405* (2013.01); *B01D 21/2433* (2013.01);
(Continued)

(58) Field of Classification Search
CPC ............ B01D 21/2433; B01D 21/2444; B01D 21/302; B01D 21/307; C02F 1/40
(Continued)

(56) References Cited

U.S. PATENT DOCUMENTS

| 3,853,768 A | 12/1974 | Bagnulo |
| 3,970,556 A * | 7/1976 | Gore .................. B01D 21/2433 |
| | | 210/776 |

(Continued)

FOREIGN PATENT DOCUMENTS

| EP | 0041728 A1 | 12/1981 |
| EP | 1606043 A1 | 12/2005 |

(Continued)

OTHER PUBLICATIONS

International Search Report and Written Opinion in corresponding International Application No. PCT/FI2018/050276 dated Jun. 29, 2018 (10 pages).

(Continued)

*Primary Examiner* — Christopher Upton
(74) *Attorney, Agent, or Firm* — Venable LLP; Jeffri A. Kaminski

(57) ABSTRACT

A method and apparatus for the removal of surface scum by using an apparatus in connection with a liquid tank, including a collecting arrangement for gathering surface scum and removing the same from the liquid tank with a surface scum discharge arrangement, and an overflow arrangement based on continuous flow for separating liquid to be treated from surface scum and for removing purified liquid from the liquid tank. The presently treated liquid is overflowed from the liquid tank into a escort water collecting space included therein by way of which it is removed from the immediate vicinity of the liquid tank. The surface scum is removed with a separating arrangement by which the surface scum is first of all separated from liquid to be treated in the liquid tank below its supernatant layer of surface scum while being flowed into the escort water collecting space and is conveyed at the same time into a collecting space of the collecting arrangement.

10 Claims, 3 Drawing Sheets

Figure 1:
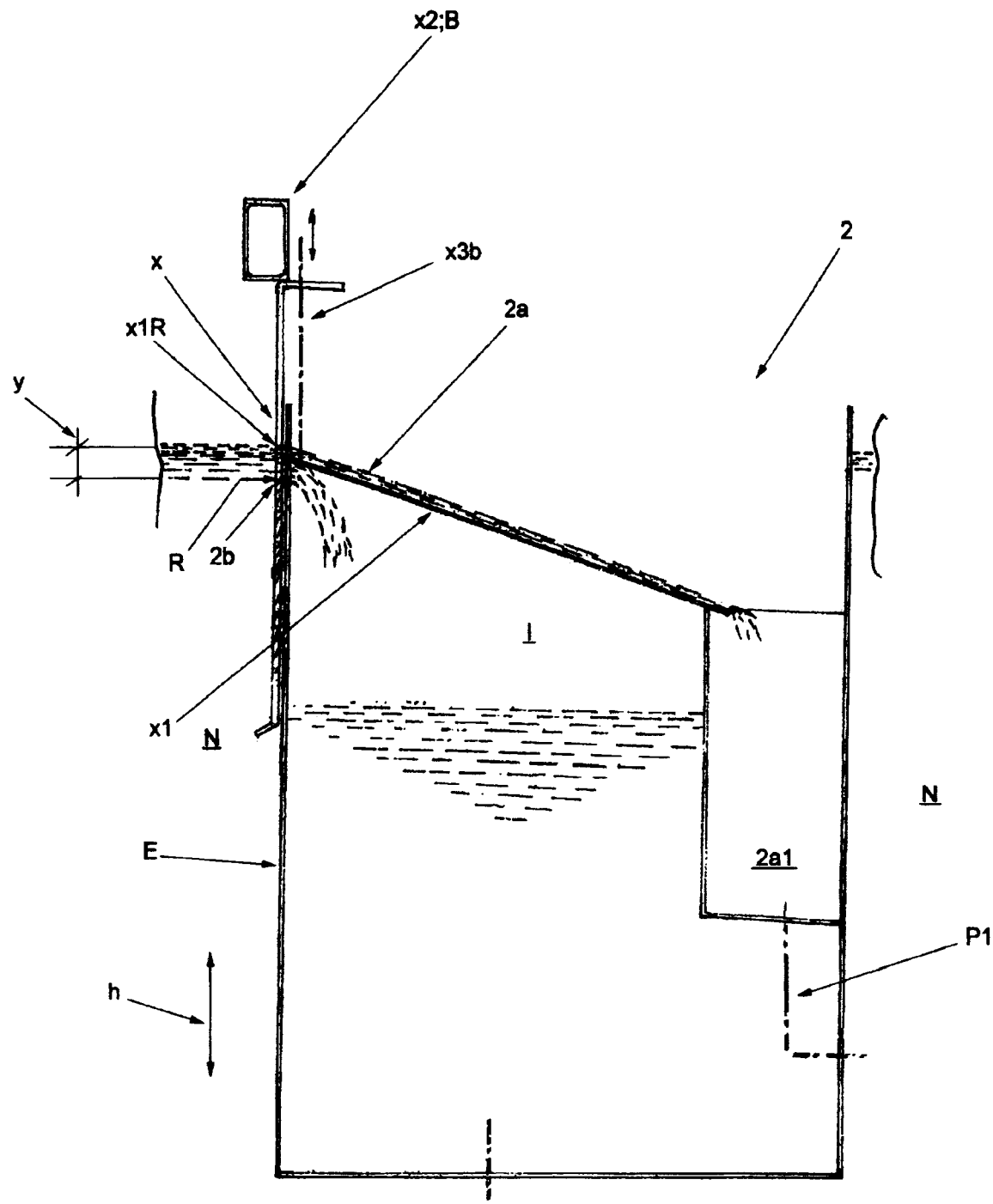

(51) Int. Cl.
  *B01D 21/30* (2006.01)
  *B01D 21/34* (2006.01)
  *C02F 1/40* (2006.01)

(52) U.S. Cl.
  CPC ......... *B01D 21/302* (2013.01); *B01D 21/307* (2013.01); *B01D 21/34* (2013.01); *C02F 1/40* (2013.01)

(58) Field of Classification Search
  USPC ........................................ 210/776, 525, 540
  See application file for complete search history.

(56) References Cited

U.S. PATENT DOCUMENTS

| | | | | |
|---|---|---|---|---|
| 3,971,719 A | * | 7/1976 | Peters ................ | B01D 17/0214 210/540 |
| 4,468,320 A | | 8/1984 | Schmidt | |
| 4,728,440 A | * | 3/1988 | van Kuijeren ..... | B01D 17/0214 210/540 |
| 4,867,872 A | * | 9/1989 | Russell ............. | B01D 21/2433 210/776 |
| 5,968,353 A | * | 10/1999 | Herbert ................ | B01D 21/245 210/540 |
| 2011/0017680 A1 | * | 1/2011 | Tuomikoski ....... | B01D 21/2433 210/776 |

FOREIGN PATENT DOCUMENTS

| | | |
|---|---|---|
| EP | 2981343 A1 | 2/2016 |
| FR | 2736344 A1 | 1/1997 |
| JP | H10277311 A | 10/1998 |
| JP | 2007098212 A | 4/2007 |
| WO | 9404464 A1 | 3/1994 |
| WO | 2004088277 A2 | 10/2004 |
| WO | 2006005788 A1 | 1/2006 |
| WO | 2014162050 A1 | 10/2014 |

OTHER PUBLICATIONS

Extended European Search Report in corresponding European Patent Application No. 18799173.2 dated Dec. 10, 2020 (15 pages).

* cited by examiner

METHOD AND APPARATUS FOR REMOVAL OF SURFACE SCUM

CROSS-REFERENCE TO RELATED APPLICATIONS

This application is a U.S. National Stage application of PCT/FI2018/050276, filed Apr. 19, 2018 and published on Nov. 15, 2018 as WO/2018/206840, which claims the benefit of Finnish Patent Application No. 20175403, filed May 8, 2017, all of which are hereby incorporated by reference in their entireties.

The invention relates to a method and apparatus for use in the removal of surface scum as defined more precisely in the preamble parts of the independent claims directed thereto.

A traditional solution for the foregoing purpose, and specifically in rectangular-shaped tanks, is such that the liquid treatment apparatus, such as a settling tank or the like, comprises a scraper bar assembly which includes several scraper bars successive in a lengthwise direction of the tank, and drive elements for moving the same, such as two chains disposed side by side and driven by means of a drive and guide wheel assembly, the scraper bars being assembled therewith in a dismountable manner for facilitating maintenance and upkeep of the scraper bar assembly.

The foregoing types of scraper bar assemblies are used today, e.g. in connection with settling tanks, in such a way that the scraper bar/bars is/are operated with chains moving on the tank's opposite side or partition walls alternately along the tank's bottom and surface so as to scrape, when proceeding along the bottom, infranatant material into a sludge pocket and, respectively, when proceeding along the surface, to convey supernatant material into a trough extending across the tank.

There are also scraper systems, wherein the bars are operated e.g. with a carriage moving on top of the tank or e.g. hydraulically. Likewise, in practice, the shape of a tank can be almost anything. Regarding e.g. circular tanks, it is a very common solution to employ a so-called bridge scraper system in the dislodgement of surface scum.

In such solutions, surface scum is conventionally removed in a so-called indirect manner such that, while proceeding along the surface, the scrapers convey substance on the surface of a liquid tank towards a collecting trough in a free floating manner. The collecting troughs employed in this context are generally mechanically operated "suction chutes", which are tipped from time to time around a longitudinal axis thereof to a surface scum "gulping" position for continued exhaustion of surface scum out of the liquid tank. On the other hand, another option in this context is a suction chute provided with a movable front wall, whose operating principle is nevertheless practically the same as described above.

A problem here is that such suction chutes take along too much surface water, i.e. some clarified water as well, which is able to drift along with surface scum further into a surface scum discharge duct.

The mounting with bearings of tippable suction arrangements on the walls of a tank is also structurally a challenging project, causing e.g. leaks. In addition, due to e.g. temperature differences, the suction chutes are quite prone to jamming. The above-described types of mechanically operated chute arrangements require naturally also actuators and automation for maneuvering the troughs, which is why such implementations call for quite frequent maintenance and upkeep operations for keeping the same in working order. One further practical problem in such solutions is excessive surface scum, which accumulates on the surface of a liquid tank, and which easily gathers also other impurities. Hence, it is indeed quite common that surface scum also enables the development of organic processes, e.g. in the form of algae growth.

For example, publication JP 102 773 11 discloses a solution suitable for the above-described objective, such as for example for so-called settling tank type operation, which is based on a surface scum overflow performed in successive phases. On the other hand, a solution similar in this respect is also disclosed in the published international application WO 94/04464, which is intended for the separation of oil or oil-contaminated substance from water by successive overflows. Another proposal that has been presented in this context is to make use of downward sloping guide surfaces in the process of overflowing surface scum from one process space into another. In practice, the problem involved in each of the above solutions is that, with principles presented therein, it is not possible to control with sufficiently simple and effective mechanisms the amount of water drifting along with surface scum being removed.

The published international application WO 2006/005788 discloses a method and arrangement for removal of surface scum, which enables the overflow of surface scum from a primary space into a secondary space to be controlled, particularly for minimizing the amount of liquid drifting together therewith. This is implemented by adjusting liquid level in the primary space by means of a flow balancing assembly connecting the primary space and a second surface chute arrangement, and/or by using an adjustment assembly present in connection with an overflow partition separating the primary and secondary spaces. This particular solution has been found highly functional in practice, although more guidance has been perceived necessary regarding the passage of surface scum in the primary space towards the secondary space.

In a type of solution as described above, both escort water and surface scum drift together against the front wall of a surface scum collector, at which point it is necessary to enhance the flow rate of escort water for enabling the entry of surface therein. Hence, the liquid space develops powerful vortices and turbulence, resulting in the surface scum blending with escort water, whereby, first of all, the surface scum collector is supplied with too much escort water and, on the other hand, the clean water chute with too much surface scum.

In U.S. Pat. No. 4,468,320 there is further disclosed a solution, wherein the surface sludge of a liquid basin is separated with a filtration arrangement by which the surface sludge is first of all separated from liquid to be treated in the liquid basin below its supernatant layer of surface sludge and, on the other hand, is conveyed into a surface sludge collecting space included in the apparatus. This solution is based on a conveyor circulating in the liquid basin which, upon circulating from the liquid basin's bottom to the liquid basin's surface, simultaneously lifts up the supernatant sludge of the liquid basin and discharges the same into a sludge pocket.

However, this solution is not suitable for the presently intended usage because the operation of a process based on continuous overflow is disrupted by a conveyor moving in the liquid tank. In addition to that, the conveyor carries along a larger or smaller amount of surface scum to the liquid tank's bottom as it travels down there, which is why it contaminates clarified liquid to be removed.

It is an objective of the method and apparatus according to the present invention to provide a decisive improvement regarding the foregoing problems and to thereby raise substantially the available prior art. In order to fulfill this objective, the method and apparatus of the invention are primarily characterized by what is presented in the characterizing parts of the independent claims directed thereto.

As the most significant benefits obtained by a method and apparatus of the invention should be mentioned the simplicity and effectiveness of constructions enabled thereby as well as the usage thereof, by virtue of which it is possible to improve remarkably the operation of a liquid treatment process based on so-called overflow principle. This is by virtue of the surface scum being removed with what is structurally a very simple apparatus immediately prior to overflow processing, without a separate equipment base for generating liquid flow in a liquid tank and without extra energy consumption, by carrying out the processing operations for surface scum and escort water in absolute separation from each other, which enables adjustment of both the amount of escort water controlling the movement of surface scum and the thickness of a surface scum layer to be removed. As a result, the apparatus making use of a method according to the invention precludes completely the drifting of surface scum together with purified liquid, such as water, into a discharge pipe system.

In an apparatus of the invention, the surface scum is separated by means of a collecting panel, which is located above the overflow edge of a separation arrangement, and by which the surface scum is first of all separated from treatable liquid while being run from the liquid tank into a escort water collecting space and is conveyed, on the other hand, into a surface scum collecting space. By means of the separation arrangement, it is further possible to maintain the overflow plate's overflow edge and the collecting panel thereabove in a steady position with respect to the liquid level of the liquid space by using a positioning system which is e.g. self-operating, such as operated with a float, buoy mechanism or the like.

Accordingly, in addition to savings in investment costs, the method and apparatus of the invention make it also possible to significantly minimize installation, maintenance and upkeep operations involved in traditional solutions as the apparatus operates in a self-acting and optimal manner such as to preclude the accumulation of excessive surface scum in the liquid tank. On the other hand, by virtue of an operating principle based on continuous flow, the surface scum is also in continuous motion with no chance to solidify or ability to form e.g. algae growth.

Other preferred embodiments for a method and apparatus of the invention are presented in the dependent claims directed thereto.

Figure 2:
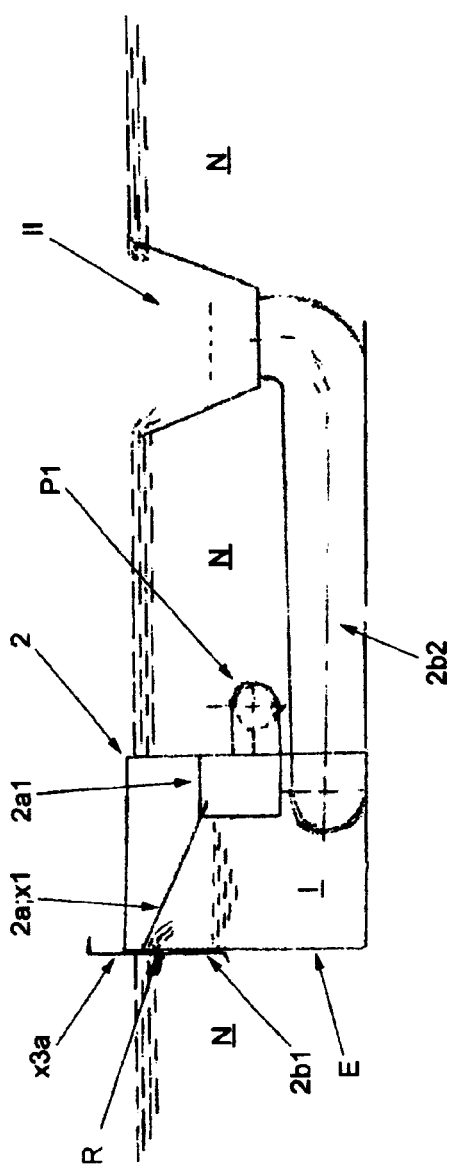
Figure 3:
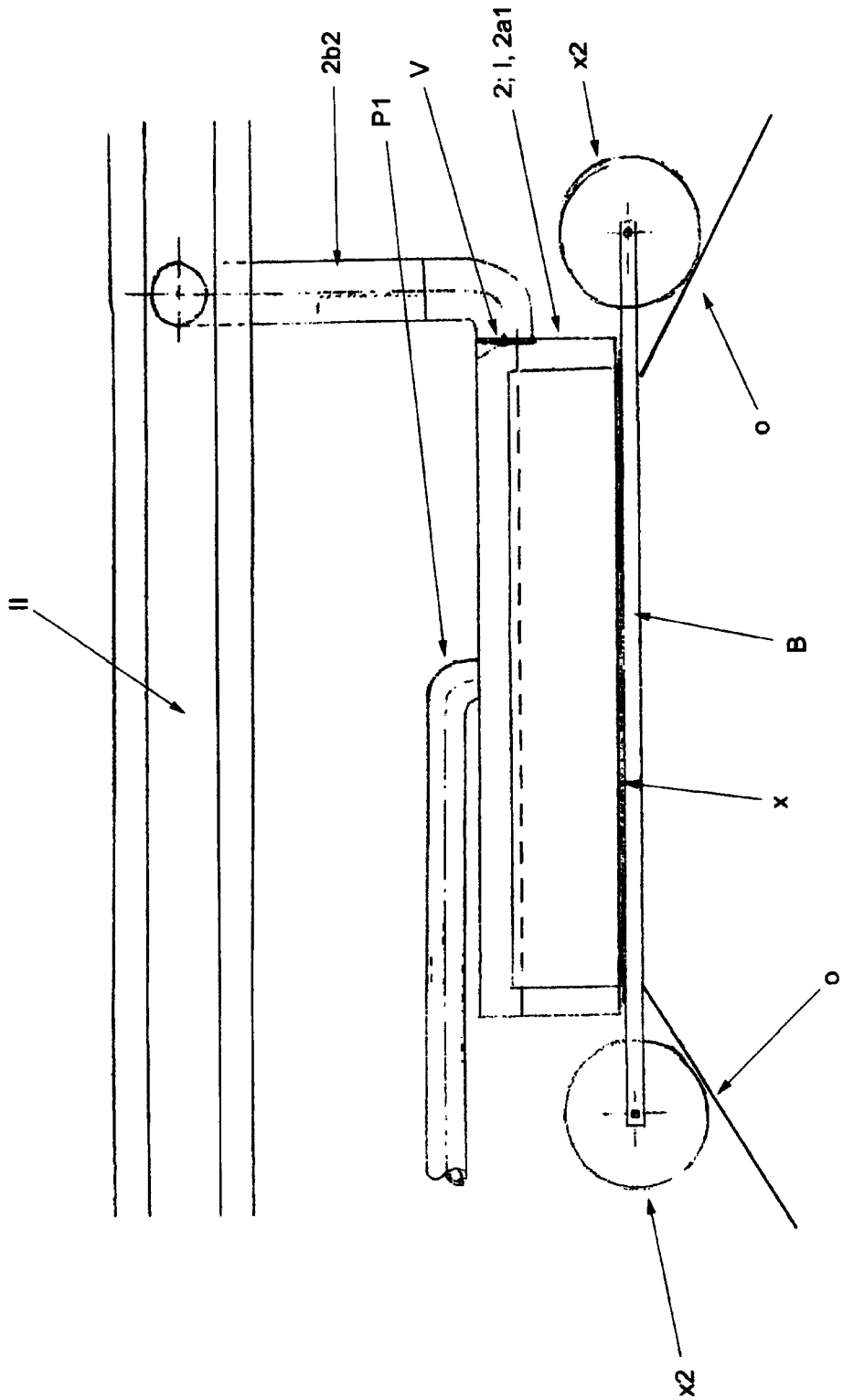

In the subsequent specification, the invention will be described in detail while referring to the accompanying drawings, in which FIG. 1 shows an exemplary longitudinal section of one preferred apparatus implementing a method of the invention, FIG. 2 shows an exemplary longitudinal section of flow connections in one preferred apparatus of the invention, and FIG. 3 shows an overhead view of one preferred apparatus of the invention.

The invention relates first of all to a method for the removal of surface scum by using an apparatus 2 in connection with a liquid tank N, such as a settling tank or the like. The apparatus comprises a collecting arrangement 2*a* for gathering surface scum and removing the same from the liquid tank with a surface scum discharge arrangement P1, such as one or more discharge pipes, ducts or the like, and an overflow arrangement 2*b* based on continuous flow for separating liquid to be treated, such as wastewater to be purified, from surface scum and for removing purified liquid, such as clarified water, from the liquid tank by overflowing the same, first of all, from the liquid tank N into a escort water collecting space I included therein and, on the other hand, into an overflow space II included in the liquid tank N, such as into one or more discharge chutes by way of which it is removed from the immediate vicinity of the liquid tank. Surface scum is removed with a separating arrangement x whereby surface scum is first of all separated from liquid to be treated in the liquid tank N below its supernatant layer of surface scum and, on the other hand, is conveyed into a collecting space 2*a*1 of the collecting arrangement 2*a*. Surface scum is separated mechanically, e.g. on a principle depicted in FIG. 1, by means of a collecting panel x1 located above y an overflow edge R overflowing the liquid to be treated from the liquid space N for separating surface scum from the presently treated liquid while flowing the same from the liquid tank N into the escort water collecting space I and for conveying the same into the surface scum collecting space 2*a*1.

Referring particularly to FIGS. 2 and 3, surface scum present in a liquid tank is conveyed into the apparatus e.g. by means of floating surface guides O. The escort water is conducted from the collecting space I by way of a discharge pipe 2*b*2 into the overflow chute II, and the surface scum, separated from liquid into the collecting space 2*a*1, respectively by way of a discharge pipe P1 e.g. into a collecting well or container external of the liquid space. In reference to a preferred embodiment depicted in FIG. 3, the removal of escort water is adjustable e.g. with a manual or e.g. wirelessly remote-controlled motor valve V or the like.

In a further preferred embodiment for a method of the invention, in particular reference to FIGS. 1 and 3, the separating arrangement x includes an overflow plate 2*b*1 provided with the overflow edge R and movable in a vertical direction h relative to a front wall E of the collecting space I, whereby the position of the overflow edge R and the collecting panel x1 thereabove y with respect to the liquid level of the liquid space N is maintained constant by means of a positioning system x2 which is e.g. self-operating, such as operated with a float, buoy mechanism or the like.

In a further preferred embodiment for a method of the invention, in particular reference to FIG. 2, the flow rate of a presently treated liquid is regulated in the liquid tank by means of a mechanical and/or auxiliary power-operated control system x3*a* used for changing the position of the overflow edge R of the overflow plate 2*b*1 in vertical direction h.

In a further preferred embodiment for a method of the invention, in particular reference to FIG. 1, the thickness of a surface scum layer is adjusted by means of a mechanical and/or auxiliary power-operated control system x3*b* by which the position of a top edge x1R of the collecting panel x1, coupled above y the overflow edge R to be movable in a vertical direction h, is substantially changed in the vertical direction h with respect to the overflow edge R.

On the other hand, the invention also relates to an apparatus operating according to the above-described method for the removal of surface scum from a liquid tank N, such as a settling tank or the like. The apparatus 2 comprises a collecting arrangement 2*a* for gathering surface scum and removing the same from the liquid tank with a surface scum discharge arrangement P1, such as one or more discharge pipes, ducts or the like, and an overflow arrangement 2*b* based on continuous flow for separating liquid to be treated, such as wastewater to be purified, from surface scum and for removing purified liquid, such as clarified water, from the liquid tank by overflowing the same, first of all, from the liquid tank N into a escort water collecting space I included therein and, on the other hand, into an overflow space II included in the liquid tank N, such as into one or more discharge chutes, for removing surface scum by way of the same from the immediate vicinity of the liquid tank. The apparatus comprises a separating arrangement x first of all for separating surface scum from liquid presently treated in the liquid tank N below its supernatant layer of surface scum and, on the other hand, for conveying the same into a collecting space 2a1 of the collecting arrangement 2a. Referring particularly to FIG. 1, the separating arrangement x includes a collecting panel x1 located above y an overflow edge R overflowing currently treated liquid from the liquid space N for separating surface scum from the presently treated liquid mechanically while flowing the same from the liquid tank N into the escort water collecting space I and for conveying the same into the surface scum collecting space 2a1.

In a preferred embodiment for an apparatus of the invention with reference to FIG. 1, the separating arrangement x includes an overflow plate 2b1 provided with an overflow edge R and movable relative to a front wall E in a vertical direction h. In this context, in a further preferred embodiment, the separating arrangement x comprises, with reference to FIGS. 1 and 3, a positioning system x2 for maintaining the overflow edge R of the overflow plate 2b1 and the collecting panel x1 located thereabove y in a constant position with respect to the liquid level of the liquid space N. The above-mentioned positioning system x2 comprises most preferably a self-operating float, buoy mechanism or the like, which, especially in an embodiment as depicted in FIG. 3, consists of floats on opposite sides of the apparatus and connected to each other with a beam B.

In a further preferred embodiment of the apparatus, its separating arrangement includes, with particular reference to FIG. 2, a mechanical and/or auxiliary power-operated control system x3a for regulating the flow rate of a liquid treated in the liquid tank by changing the position of the overflow edge R of the overflow plate 2b1 in vertical direction h.

In a further preferred embodiment of the apparatus, its separating arrangement x includes, with particular reference to FIG. 1, a mechanical and/or auxiliary power-operated control system x3b for adjusting the thickness of a surface scum layer to be separated from the currently treated liquid by substantially changing, in a vertical direction h with respect to the overflow edge R, the position of a top edge x1R of the collecting panel x1 coupled above y the overflow edge R so as to be movable in the vertical direction h.

It is obvious that the invention is not limited to the embodiments presented or described above but it can undergo even quite profound changes within the basic concept of the invention as required at each particular time. Thus, in its most extensive sense, the invention is also directed to basins, which may include some sort of scraper bar system working on the surface of the liquid basin, and/or in which surface scum is conveyed with any system towards one or more mechanisms present side by side in the liquid basin. Naturally, there also exists a multitude of various scraper bar constructions, enabling additionally the use of e.g. urethane-based or the like filers etc. in association therewith. With regard to an overflow system, it is further possible to also utilize therewith a downward sloping, e.g. sequentially steepening, straight or continuously curving guide surface, which may also be either convex or concave.

The invention claimed is:

1. A method for removing surface scum from a liquid tank with an apparatus, which comprises a collecting arrangement for gathering surface scum and removing the same from the liquid tank with a separating arrangement, by which the surface scum is separated from liquid to be treated in the liquid tank and the conveyed into a surface scum collecting space, and a surface scum discharge arrangement connected to the surface scum collecting space, by way of which the surface scum is removed from the immediate vicinity of the liquid tank; and an overflow arrangement by means of which escort liquid with supernatant surface scum is overflown from the liquid tank into an escort water collecting space included in the apparatus and the escort liquid is directed therefrom into an overflow space included in the liquid tank, for the collecting of treated liquid, wherein surface scum is separated mechanically when the escort liquid with supernatant surface scum overflows from the liquid tank into the escort liquid collecting space by means of a collecting panel located above an overflow edge that brings about said overflow.

2. A method according to claim 1, wherein the separating arrangement includes an overflow plate provided with the overflow edge and movable in a vertical direction relative to a front wall of the collecting space, whereby the position of the overflow edge and the collecting panel thereabove with respect to the liquid level of the liquid space is maintained constant by means of a positioning system which is self-operating, with a float or buoy mechanism.

3. A method according to claim 2, wherein the flow rate of a presently treated liquid is regulated in the liquid tank by means of a mechanical and/or auxiliary power-operated control system used for changing the position of the overflow edge of the overflow plate in vertical direction.

4. A method according to claim 1, wherein the thickness of a surface scum layer is adjusted by means of a mechanical and/or auxiliary power-operated control system by which the position of a top edge of the collecting panel, coupled above the overflow edge to be movable in a vertical direction, is substantially changed in the vertical direction with respect to the overflow edge.

5. An apparatus for removing surface scum from a liquid tank, said apparatus comprising a collecting arrangement for gathering surface scum and removing the same from the liquid tank with a surface scum discharge arrangement, and an overflow arrangement based on continuous flow for separating liquid to be treated, from surface scum and for removing purified liquid from the liquid tank by overflowing the purified liquid and surface scum from the liquid tank into an escort water collecting space included therein and then into an overflow space included in the liquid tank for removing surface scum by way of the same from the immediate vicinity of the liquid tank, and whereby the collecting arrangement comprises a separating arrangement for separating surface scum from liquid presently treated in the liquid tank below its supernatant layer of surface scum and for conveying the liquid and scum into a collecting space of the collecting arrangement, wherein the separating arrangement includes a collecting panel located above an overflow edge that brings about overflow of an escort liquid with the supernatant layer of surface scum from the liquid space for separating surface scum from the presently treated liquid mechanically while flowing the escort liquid from the liquid tank into the escort water collecting space and for conveying the surface scum into the surface scum collecting space.

6. An apparatus according to claim 5, wherein the separating arrangement includes an overflow plate provided with the overflow edge and movable relative to a front wall in a vertical direction.

7. An apparatus according to claim 6, wherein the separating arrangement comprises a positioning system for maintaining the overflow edge of the overflow plate and the collecting panel located thereabove in a constant position with respect to the liquid level of the liquid space.

8. An apparatus according to claim 7, wherein the positioning system comprises a self-operating float or buoy mechanism.

9. An apparatus according to claim 6, wherein the separating arrangement includes a mechanical and/or auxiliary power-operated control system for regulating the flow rate of a liquid treated in the liquid tank by changing the position of the overflow edge of the overflow plate in vertical direction.

10. An apparatus according to claim 5, wherein the separating arrangement includes a mechanical and/or auxiliary power-operated control system for adjusting the thickness of a surface scum layer to be separated from the currently treated liquid by substantially changing, in a vertical direction with respect to the overflow edge, the position of a top edge of the collecting panel coupled above the overflow edge so as to be movable in the vertical direction.

* * * * *